UNITED STATES PATENT OFFICE.

MAGNUS KLING, OF READING, PENNSYLVANIA.

IMPROVEMENT IN PERCUSSION-POWDER.

Specification forming part of Letters Patent No. 18,016, dated August 18, 1857.

*To all whom it may concern:*

Be it known that I, MAGNUS KLING, of the city of Reading, in the county of Berks and State of Pennsylvania, have invented a new and useful composition for the manufacture of percussion-caps and caps used in fire-arms, similar to the Prussian "Zind nadel Gewehr;" and I do hereby declare that the following is a full and exact description thereof.

This chemical compound consists in the mixture of antimony, chlorate of potassa, oxalic acid, and glue, or other substances of a similar nature. I have, however, found the following proportions of the ingredients to answer very well in the manufacture of the compound, viz: One ounce of antimony, one ounce of chlorate of potassa, mixed with equal proportions of glue dissolved in boiling water, and oxalic acid dissolved in boiling water, and then the whole mixed to the consistency of paste, and then used for caps, which, when dry, are fit for use.

The materials used in the above-described composition I have, after numerous experiments, found to be superior to any other composition now in use for the manufacture of percussion-caps for fire-arms, from the fact that they are not affected by moisture or by being stored up for any length of time. The proportions in which I use the ingredients which form the composition are as follows: One ounce of antimony, one ounce of chlorate of potassa, one ounce of oxalic acid. The oxalic acid I first dissolve in water. I then dissolve a half-pound of glue in boiling water and mix the glue with the other ingredients to the consistency of paste, and in which paste-like state it is used for the manufacture of caps, &c., for fire-arms.

Now, what I claim therein as new, and desire to secure by Letters Patent, is—

The combination of antimony with chlorate of potassa, oxalic acid, and glue mixed in the above-named proportions, for a composition for the manufacture of percussion-caps for fire-arms.

MAGNUS KLING.

Witnesses:
J. B. WANNER,
A. B. WANNER.